United States Patent
Chen et al.

(10) Patent No.: US 9,373,996 B2
(45) Date of Patent: Jun. 21, 2016

(54) INVERTING APPARATUS AND PHOTOVOLTAIC POWER SYSTEM USING THE SAME

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 0 days.

(21) Appl. No.: 14/631,841

(22) Filed: Feb. 26, 2015

(65) Prior Publication Data
US 2015/0244253 A1  Aug. 27, 2015

Related U.S. Application Data

(60) Provisional application No. 61/944,587, filed on Feb. 26, 2014.

(30) Foreign Application Priority Data

Jan. 26, 2015  (TW) .............................. 104102536 A

(51) Int. Cl.
| | | |
|---|---|---|
| *H02M 7/537* | (2006.01) | |
| *H02M 7/5387* | (2007.01) | |
| *H02M 7/53* | (2006.01) | |
| *H02M 1/32* | (2007.01) | |
| *H02M 7/48* | (2007.01) | |

(52) U.S. Cl.
CPC *H02M 1/32* (2013.01); *H02M 7/48* (2013.01); *Y02E 10/56* (2013.01)

(58) Field of Classification Search
CPC . H02M 7/537; H02M 1/32; H02M 2001/325; H02M 7/53; H02M 7/5387; H02M 7/53871
USPC .......................... 363/56.01, 56.02; 361/41–50
See application file for complete search history.

(56) References Cited

U.S. PATENT DOCUMENTS

| | | | |
|---|---|---|---|
| 8,269,451 B2* | 9/2012 | Kitanaka ............... | B60L 3/0023 318/434 |
| 2001/0004322 A1* | 6/2001 | Kurokami ......... | H02M 7/53873 363/56.03 |
| 2003/0067723 A1* | 4/2003 | Suzui ..................... | H02H 3/337 361/42 |
| 2006/0237057 A1* | 10/2006 | Buij ......................... | H02H 3/16 136/244 |
| 2015/0168473 A1* | 6/2015 | Fornage ............... | G01R 31/025 324/509 |

* cited by examiner

*Primary Examiner* — Timothy J Dole
*Assistant Examiner* — Sisay G Tiku
(74) *Attorney, Agent, or Firm* — Jianq Chyun IP Office

(57) ABSTRACT

An inverting apparatus and a photovoltaic power system using the same are provided. The inverting apparatus includes an inverting circuit, a control circuit, and a voltage regulator-based ground detection circuit. The control circuit controls the power conversion of the inverting circuit. The voltage regulator-based ground detection circuit samples an input voltage of the DC input power, and performs voltage regulation and voltage division on the input voltage to generate a ground indication voltage. The electric potential of the output terminal of the voltage regulator is built based on a photovoltaic ground terminal of a photovoltaic module. The ground indication voltage is the voltage difference between an output terminal of the voltage regulator and a device ground terminal of the inverting apparatus. The control circuit determines whether a ground fault occurs to the photovoltaic module and enables a ground protection mechanism to control the inverting circuit when the ground fault occurs.

8 Claims, 2 Drawing Sheets

INVERTING APPARATUS AND PHOTOVOLTAIC POWER SYSTEM USING THE SAME

CROSS-REFERENCE TO RELATED APPLICATION

This application claims the priority benefits of U.S. provisional application Ser. No. 61/944,587, filed on Feb. 26, 2014 and Taiwan application serial no. 104102536, filed on Jan. 26, 2015. The entirety of each of the above-mentioned patent applications is hereby incorporated by reference herein and made a part of this specification.

BACKGROUND OF THE INVENTION

1. Field of the Invention

The invention relates to a power conversion technique, and more particularly, to an inverting apparatus and a photovoltaic power system using the same.

2. Description of Related Art

In a typical photovoltaic power system, a front-end photovoltaic module (such as solar panel) is generally disposed outdoors to receive sunlight. However, the photovoltaic module disposed outdoors is inevitably affected by climate and environment, and therefore has the risk of damage.

For instance, a photovoltaic ground terminal of the photovoltaic module may be in a floating state due to climate impact, such that the photovoltaic ground terminal of the photovoltaic module and a device ground terminal of a back-end inverting apparatus have different potentials. Such a phenomenon is referred to as a ground fault of the photovoltaic module. In a ground fault condition, a leakage current is generated between the photovoltaic ground terminal and the device ground terminal due to potential difference. Excessive leakage current may cause electric shock to the user or the occurrence of fire.

In current techniques, a low-frequency signal injection method or a variable-frequency signal injection method is generally adopted to detect the issue of ground fault of the photovoltaic module. However, current methods all need to apply complex circuit architectures, and cannot accurately detect the occurrence of a ground fault.

SUMMARY OF THE INVENTION

The invention provides an inverting apparatus and a photovoltaic power system using the same capable of accurately detecting whether a ground fault occurs to a front-end photovoltaic module.

An inverting apparatus of the invention is suitable for receiving a DC input power from a photovoltaic module and accordingly generate an AC output power and provide the AC output power to a power grid. The inverting apparatus includes an inverting circuit, a control circuit, and a voltage regulator-based ground detection circuit. The inverting circuit is configured to convert the DC input power into the AC output power. The control circuit is coupled to the inverting circuit and is configured to control the power conversion of the inverting circuit. The voltage regulator-based ground detection circuit is coupled to the inverting circuit and the control circuit, and is configured to sample an input voltage of the DC input power, and perform voltage regulation and voltage division on the input voltage, so as to generate a ground indication voltage. The electric potential of an output terminal of the voltage regulator is built based on a photovoltaic ground terminal. The ground indication voltage is the voltage difference between the output terminal of the voltage regulator and the device ground terminal of the inverting apparatus. The control circuit determines whether a ground fault occurs to the photovoltaic module according to the ground indication voltage and enables a ground protection mechanism to control the inverting circuit when the control circuit determines a ground fault occurs.

In an embodiment of the invention, the control circuit determines whether the ground indication voltage is located within a normal voltage range. In the case that the ground indication voltage is located within the normal voltage range, the control circuit determines a ground fault does not occur to the photovoltaic module, and in the case that the ground indication voltage is located outside the normal voltage range, the control circuit determines a ground fault occurs to the photovoltaic module.

In an embodiment of the invention, the voltage regulator-based ground detection circuit includes a power conversion unit and a detection unit. The power conversion unit is configured to sample an input voltage and accordingly generate a reference voltage. The detection unit is coupled to the power conversion unit to receive the reference voltage, and performs voltage regulation on the reference voltage to generate a regulation voltage, and generates a ground indication voltage according to the regulation voltage. The regulation voltage is the voltage difference between the output terminal of the voltage regulator and the photovoltaic ground terminal of the photovoltaic module.

In an embodiment of the invention, the detection unit includes a voltage regulator, a first resistor, and a second resistor. The input terminal of the voltage regulator receives the reference voltage, and the output terminal of the voltage regulator outputs the regulation voltage. The first terminal of the first resistor is coupled to the output terminal of the voltage regulator, and the second terminal of the first resistor is coupled to the device ground terminal of the inverting apparatus, wherein the ground indication voltage is the voltage drop of the first resistor. The first terminal of the second resistor is coupled to the second terminal of the first resistor and the photovoltaic ground terminal, and the second terminal of the second resistor is coupled to the photovoltaic ground terminal of the photovoltaic module.

In an embodiment of the invention, the detection unit further includes a third resistor and a fourth resistor. The first terminal of the third resistor receives the reference voltage, and the second terminal of the third resistor is coupled to the input terminal of the voltage regulator. The first terminal of the fourth resistor is coupled to the second terminal of the third resistor, and the second terminal of the fourth resistor is coupled to the output terminal of the voltage regulator and the first terminal of the first resistor.

A photovoltaic power system of the invention includes a photovoltaic module and an inverting apparatus. The photovoltaic module is configured to generate a DC input power, wherein the photovoltaic module has a photovoltaic ground terminal, and the inverting apparatus has a device ground terminal. The inverting apparatus is coupled to the photovoltaic module, and is suitable for converting the DC input power into an AC output power and provide the AC output power to a power grid, wherein the inverting apparatus includes an inverting circuit, a control circuit, and a voltage regulator-based ground detection circuit. The inverting circuit is configured to convert the DC input power into the AC output power. The control circuit is coupled to the inverting circuit and is configured to control the power conversion of the inverting circuit. The voltage regulator-based ground detection circuit is coupled to the inverting circuit and the control circuit and is configured to sample an input voltage of the DC input power, and performs voltage regulation and voltage division on the input voltage to generate a ground indication voltage, wherein the electric potential of the output terminal of the voltage regulator is built based on the photovoltaic ground terminal, and the ground indication voltage is the voltage difference between the output terminal of the voltage regulator and the device ground terminal. The control circuit determines whether a ground fault occurs to the photovoltaic module according to the ground indication voltage and enables a ground protection mechanism to control the inverting circuit when the control circuit determines the ground fault occurs.

Based on the above, the embodiments of the invention provide an inverting apparatus and a photovoltaic power system using the same capable of performing voltage regulation and voltage division on an input voltage via the voltage regulator-based ground detection circuit, and thereby generate one ground indication voltage indicating the voltage difference of the photovoltaic ground terminal of the photovoltaic module and the output terminal of the voltage regulator. In particular, the inverting apparatus can determine whether a ground fault occurs to the photovoltaic module according to whether the ground indication voltage is located within the normal voltage range, and accordingly enable a corresponding protection mechanism.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
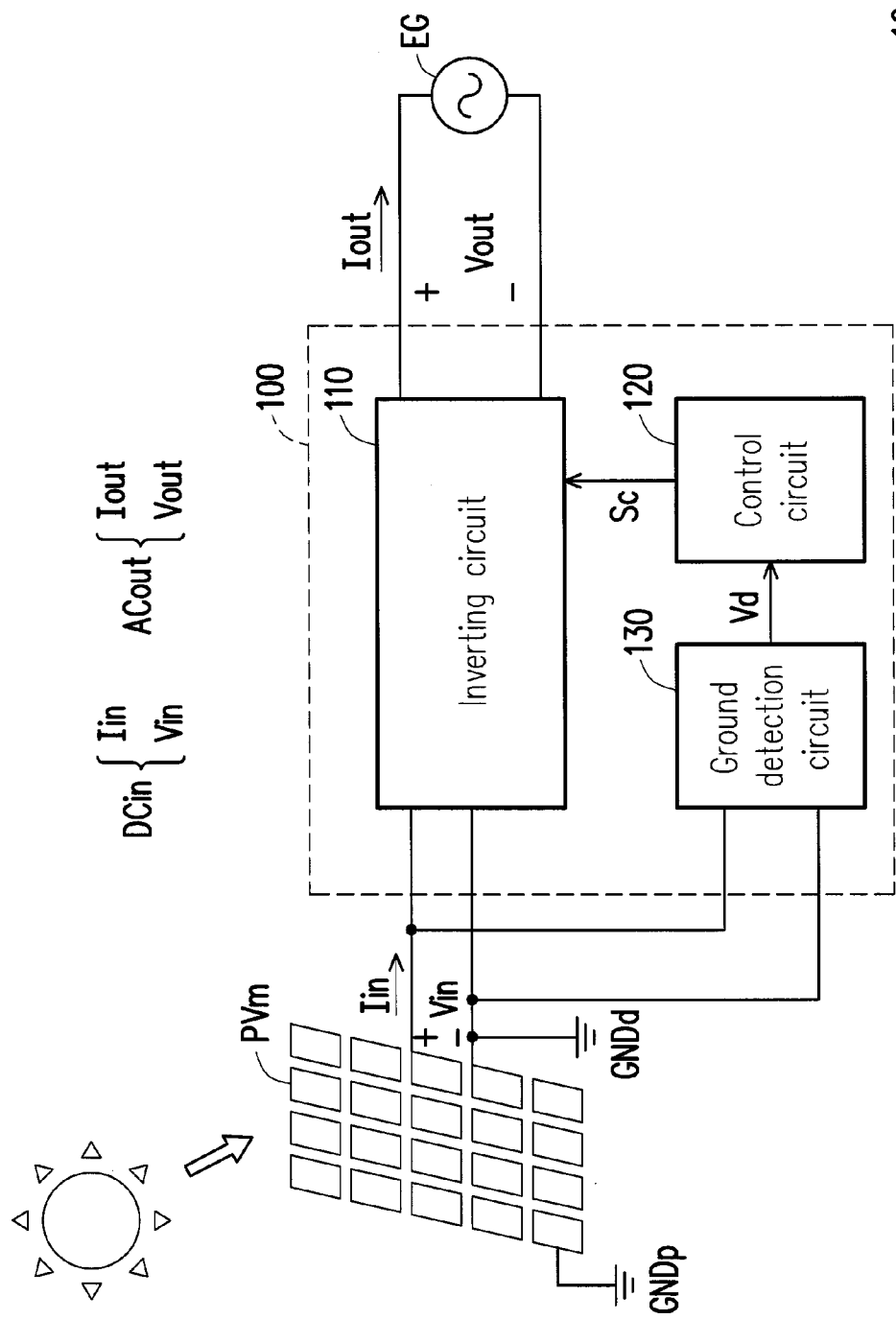
FIG. 1 is a schematic of a photovoltaic power system of an embodiment of the invention.

To make the contents of the disclosure more easily understood, embodiments are provided below as examples of the plausibility of implementation of the disclosure. Moreover, when applicable, devices/components/steps having the same reference numerals in figures and embodiments represent the same or similar parts.

FIG. 1 is a schematic of a photovoltaic power system of an embodiment of the invention. Referring to FIG. 1, in the present embodiment, a photovoltaic power system 10 includes a photovoltaic module PVm and an inverting apparatus 100. The photovoltaic module PVm is configured to convert solar energy into a DC input power DCin (containing an input voltage Vin and an input current Iin) in energy form. The inverting apparatus 100 receives the DC input power DCin outputted by the photovoltaic module PVm, and accordingly generates an AC output power ACout (contains an output voltage Vout and an output current Iout). In particular, the photovoltaic power system of the present embodiment is a photovoltaic grid system, the AC output power of the inverting apparatus is provided to a power grid EG connected to the back-end, but is not limited thereto. The back-end of the inverting apparatus can also be connected to a battery system or an illumination system.

In the present embodiment, the inverting apparatus 100 includes an inverting circuit 110, a control circuit 120, and a ground detection circuit 130. The inverting circuit 110 receives the DC input power DCin from the photovoltaic module PVm and is configured to convert the DC input power DCin into the AC output power ACout. In particular, the circuit configuration of the inverting circuit 110 can be, for instance, half-bridge asymmetric, half-bridge symmetric, full-bridge, or other possible inverting circuit configurations, and the invention does not particularly limit the circuit configuration of the inverting circuit 110.

The control circuit 120 is coupled to the inverting circuit 110 and is configured to provide a control signal Sc to control the power conversion operation of the inverting circuit 110, and the control signal Sc can be, for instance, configured to control a PWM signal of a switching cycle of the inverting circuit 110, but the invention is not limited thereto.

The circuit architecture of the ground detection circuit 130 of the present embodiment is based on a voltage regulator, and is coupled to the inverting circuit 110 and the control circuit 120. The ground detection circuit 130 is configured to sample the input voltage Vin of the DC input power DCin, and performs voltage regulation and voltage division on the input voltage Vin via the circuit architecture of the voltage regulator (specifically described in later embodiments), and thereby generates a ground indication voltage Vd to the control circuit 120. Therefore, the control circuit 120 can determine whether a ground fault occurs to the photovoltaic module PVm according to the ground indication voltage Vd (i.e., the electric potential of a photovoltaic ground terminal GNDp of the photovoltaic module PVm and the electric potential of a device ground terminal GNDd of the inverting apparatus 100 are not equal), and enables a ground protection mechanism to control the inverting circuit 110 when the control circuit 120 determines the ground fault occurs to the photovoltaic module PVm. As a result, electric shock to the user or the occurrence of fire caused by the issue of ground fault of the photovoltaic module PVm is prevented.

In the present embodiment, the ground indication voltage Vd generated by the ground detection circuit 130 is the voltage difference between the output terminal of the voltage regulator and the device ground terminal GNDd of the inverting apparatus 100. In particular, since the voltage of the output terminal of the voltage regulator is built based on the photovoltaic ground terminal GNDp of the photovoltaic module PVm, variations in the ground indication voltage Vd can indicate whether the electric potentials of the photovoltaic ground terminal GNDp and the device ground terminal GNDd are equal. For instance, the control circuit 120 determines whether the ground indication voltage Vd is located within the normal voltage range (can be arbitrarily defined by the designer), and in the case that the ground indication voltage Vd is located within the normal voltage range, the control circuit 120 determines a ground fault does not occur to the photovoltaic module PVm. On the contrary, in the case that the ground indication voltage Vd is located outside the normal voltage range, the control circuit 120 determines the ground fault occurs to the photovoltaic module PVm.

The specific architecture of the ground detection circuit 130 of an embodiment of the invention is described below with reference to FIG. 2. In particular, FIG. 2 is a circuit schematic of a ground detection circuit of an embodiment of the invention.

Figure 2:
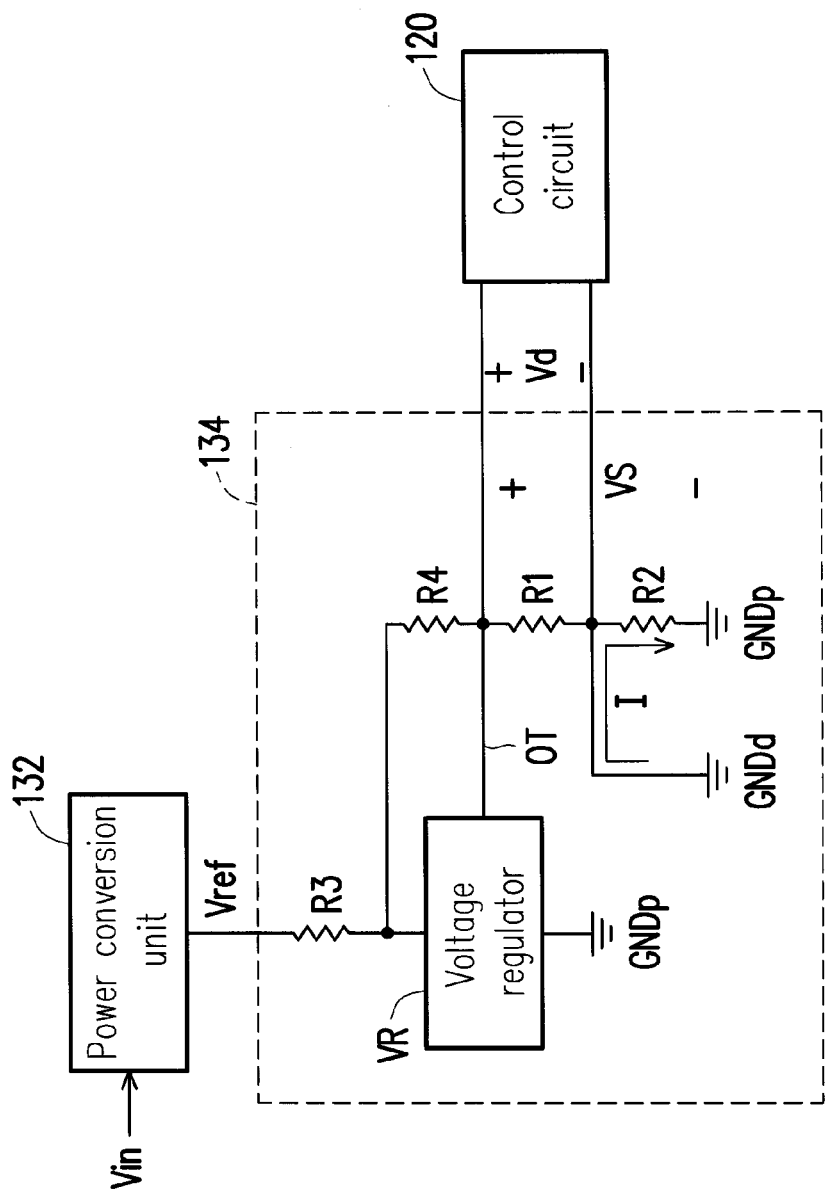
FIG. 2 is a circuit schematic of a ground detection circuit of an embodiment of the invention.

Referring to both FIG. 1 and FIG. 2, the ground detection circuit 130 of the present embodiment includes a power conversion unit 132 and a detection unit 134. The power conversion unit 132 is coupled to the input terminal of the inverting circuit 110 to sample the input voltage Vin, and performs power conversion on the input voltage Vin to accordingly generate a reference voltage Vref.

The detection unit 134 is coupled to the power conversion unit 132 to receive the reference voltage Vref. In particular, the detection unit 134 performs voltage regulation on the reference voltage Vref to generate a regulation voltage Vs, and generates the ground indication voltage Vd according to the regulation voltage Vs. Accordingly, the regulation voltage Vs is the voltage difference between an output terminal OT of the voltage regulator and the photovoltaic ground terminal GNDp of the photovoltaic module PVm.

More specifically, the detection unit 134 can be, for instance, formed by a voltage regulator VR and resistors R1 to R4. The voltage regulator VR receives the reference voltage Vref from the power conversion unit 132, and performs voltage regulation based on the reference voltage Vref to accordingly output the regulation voltage Vs at the output terminal OT.

The first terminal of the resistor R1 is coupled to the output terminal of the voltage regulator VR, and the second terminal of the resistor R1 is coupled to the device ground terminal GNDd of the inverting apparatus 100. The first terminal of the resistor R2 is coupled to the second terminal of the resistor R1 and the device ground terminal GNDd, and the second terminal of the resistor R2 is coupled to the photovoltaic ground terminal GNDp. The first terminal of the resistor R3 receives the reference voltage Vref, and the second terminal of the resistor R3 is coupled to the input terminal of the voltage regulator VR. The first terminal of the resistor R4 is coupled to the second terminal of the resistor R3, and the second terminal of the resistor R4 is coupled to the output terminal of the voltage regulator VR and the first terminal of the resistor R1.

In the present embodiment, the ground indication voltage Vd is the voltage drop of the resistor R1, and the regulation voltage Vs is the voltage drop of the resistors R1 and R2 and is also the voltage difference between the output terminal OT and the photovoltaic ground terminal GNDp.

Specifically, when a ground fault does not occur to the photovoltaic module PVm, the photovoltaic ground terminal GNDp and the device ground terminal GNDd substantially have the same electric potentials. Therefore, in the detection unit 134, the resistor R2 is in a short-circuit state, such that the voltage value of the ground indication voltage Vd is the same as the voltage value of the regulation voltage Vs. Since the regulation voltage Vs is a fixed voltage value, the designer can set a corresponding normal voltage range according to the rated output of the voltage regulator VR, such that the voltage value of the ground indication voltage Vd falls within the normal voltage range. In this way, the control circuit 120 can determine that the ground fault does not occur to the photovoltaic module PVm according to the ground indication voltage Vd.

Moreover, when a ground fault occurs to the photovoltaic module PVm, the photovoltaic ground terminal GNDp and the device ground terminal GNDd have different electric potentials. In other words, the device ground terminal GNDd and the photovoltaic ground terminal GNDp generate a leakage current I passing through the resistor R2, and therefore a voltage difference is generated at the two terminals of the resistor R2. It should be mentioned that, the arrow direction of the leakage current I is only illustrative, and under different ground fault conditions, the leakage current I can also flow from the photovoltaic ground terminal GNDp to the device ground terminal GNDd.

At this point, the voltage drop of the resistor R2 is increased in response to the passing leakage current I. Since the regulation voltage Vs is a fixed voltage value, the voltage drop (i.e., ground indication voltage Vd) of the resistor R1 responds to the increase in the voltage drop of the resistor R2 and is correspondingly reduced. In the case that the leakage current I exceeds a certain current amount, the ground indication voltage Vd is increased or reduced beyond the normal voltage range, such that the control circuit 120 accordingly determines the ground fault occurs to the photovoltaic module PVm.

For instance, in the case that the regulation voltage Vs of the rated output of the voltage regulator VR is 2.5 V, a leakage current I of 1 mA is generated between the photovoltaic ground terminal GNDp and the device ground terminal GNDd in a ground fault condition. The resistance values of the resistors R1 and R2 are, for instance, 1 kg), and the normal voltage range is, for instance, 2 V to 3 V. At this point, the resistor R2 responds to a leakage current of 1 mA and builds a voltage drop of 1 V. As a result, the voltage drop/ground indication voltage Vd of the resistor R1 is reduced from 2.5 V to 1.5 V. In this way, the control circuit 120 determines that the ground fault occurs to the photovoltaic module PVm according to the ground indication voltage Vd.

Based on the above, the embodiments of the invention provide an inverting apparatus and a photovoltaic power system using the same capable of performing voltage regulation and voltage division on the input voltage via the voltage regulator-based ground detection circuit, and thereby generate one ground indication voltage indicating the voltage difference of the device ground terminal GNDd of the inverting apparatus 100 and the output terminal of the voltage regulator. In particular, the inverting apparatus can determine whether a ground fault occurs to the photovoltaic module according to whether the ground indication voltage is located within the normal voltage range, and accordingly enable a corresponding protection mechanism.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An inverting apparatus suitable for receiving a DC input power from a photovoltaic module and accordingly generate an AC output power, the inverting apparatus comprising:
   an inverting circuit configured to convert the DC input power into the AC output power;
   a control circuit coupled to the inverting circuit and configured to control a power conversion of the inverting circuit; and
   a voltage regulator-based ground detection circuit coupled to the DC input power and the control circuit, and configured to sample an input voltage of the DC input power and perform voltage regulation and voltage division on the input voltage by a detection unit to generate a ground indication voltage, wherein an electric potential of an output terminal of the voltage regulator is built based on a photovoltaic ground terminal of the photovoltaic module, and the ground indication voltage is a voltage difference between the output terminal of the voltage regulator and a device ground terminal of the inverting apparatus, wherein the detection unit comprises:
   the voltage regulator, having an input terminal to receive a reference voltage sampling from the input voltage and the output terminal to output a regulation voltage;
   a first resistor, having a first terminal coupled to the output terminal of the voltage regulator and a second terminal coupled to the device ground terminal of the inverting apparatus, wherein the ground indication voltage is a voltage drop of the first resistor; and
   a second resistor, having a first terminal coupled to the second terminal of the first resistor and the device ground terminal, and a second terminal coupled to the photovoltaic ground terminal of the photovoltaic module,
wherein the control circuit determines whether a ground fault occurs to the photovoltaic module according to the ground indication voltage and enables a ground protection mechanism to control the inverting circuit when the control circuit determines the ground fault occurs.

2. The inverting apparatus of claim 1, wherein the control circuit determines whether the ground indication voltage is located within a normal voltage range, in the case that the ground indication voltage is located within the normal voltage range, the control circuit determines the ground fault does not occur to the photovoltaic module, and in the case that the ground indication voltage is located outside the normal voltage range, the control circuit determines the ground fault occurs to the photovoltaic module.

3. The inverting apparatus of claim 1, wherein the voltage regulator-based ground detection circuit further comprises:
   a power conversion unit for sampling the input voltage and accordingly generating the reference voltage,
   wherein the detection unit is coupled to the power conversion unit to receive the reference voltage, perform voltage regulation on the reference voltage to generate the regulation voltage, and generate the ground indication voltage according to the regulation voltage, wherein the regulation voltage is a voltage difference between the output terminal of the voltage regulator and the photovoltaic ground terminal of the photovoltaic module.

4. The inverting apparatus of claim 1, wherein the detection unit further comprises:
   a third resistor, having a first terminal receiving the reference voltage and a second terminal coupled to the input terminal of the voltage regulator; and
   a fourth resistor, having a first terminal coupled to the second terminal of the third resistor, and a second terminal coupled to the output terminal of the voltage regulator and the first terminal of the first resistor.

5. A photovoltaic power system, comprising:
   a photovoltaic module configured to generate a DC input power, wherein the photovoltaic module has a photovoltaic ground terminal; and
   an inverting apparatus coupled to the photovoltaic module and suitable for converting the DC input power into an AC output power, wherein the inverting apparatus has a device ground terminal, and the inverting apparatus comprises:
      an inverting circuit configured to convert the DC input power into the AC output power;
      a control circuit coupled to the inverting circuit and configured to control a power conversion of the inverting circuit; and
      a voltage regulator-based ground detection circuit coupled to the inverting circuit and the control circuit, and configured to sample an input voltage of the DC input power and perform voltage regulation and voltage division on the input voltage by a detection unit to generate a ground indication voltage, wherein an electric potential of an output terminal of the voltage regulator is built based on the photovoltaic ground terminal, and the ground indication voltage is a voltage difference between the output terminal of the voltage regulator and the device ground terminal,
wherein the detection unit comprises:
   the voltage regulator, having an input terminal to receive a reference voltage sampling from the input voltage, and the output terminal to output a regulation voltage;
   a first resistor, having a first terminal coupled to the output terminal of the voltage regulator and a second terminal coupled to the device ground terminal of the inverting apparatus, wherein the ground indication voltage is a voltage drop of the first resistor; and
   a second resistor, having a first terminal coupled to the second terminal of the first resistor and the device ground terminal, and a second terminal coupled to the photovoltaic ground terminal of the photovoltaic module,
wherein the control circuit determines whether a ground fault occurs to the photovoltaic module according to the ground indication voltage and enables a ground protection mechanism to control the inverting circuit when the control circuit determines the ground fault occurs.

6. The photovoltaic power system of claim 5, wherein the control circuit determines whether the ground indication voltage is located within a normal voltage range, in the case that the ground indication voltage is located within the normal voltage range, the control circuit determines the ground fault does not occur to the photovoltaic module, and in the case that the ground indication voltage is located outside the normal voltage range, the control circuit determines the ground fault occurs to the photovoltaic module.

7. The photovoltaic power system of claim 5, wherein the voltage regulator-based ground detection circuit further comprises:
   a power conversion unit for sampling the input voltage and accordingly generating the reference voltage,
   wherein the detection unit is coupled to the power conversion unit to receive the reference voltage, perform voltage regulation on the reference voltage to generate the regulation voltage, and generate the ground indication voltage according to the regulation voltage, wherein the regulation voltage is a voltage difference between the output terminal of the voltage regulator and the photovoltaic ground terminal of the photovoltaic module.

8. The photovoltaic power system of claim 5, wherein the detection unit further comprises:
   a third resistor, having a first terminal receiving the reference voltage, and a second terminal coupled to the input terminal of the voltage regulator; and
   a fourth resistor, having a first terminal coupled to the second terminal of the third resistor, and a second terminal coupled to the output terminal of the voltage regulator and the first terminal of the first resistor.

* * * * *